(12) United States Patent
Schoenberg et al.

(10) Patent No.: US 11,316,946 B2
(45) Date of Patent: Apr. 26, 2022

(54) PROCESSING AND CACHING IN AN INFORMATION-CENTRIC NETWORK

(71) Applicant: Intel Corporation, Santa Clara, CA (US)

(72) Inventors: Sebastian Schoenberg, Hillsboro, OR (US); Andrew Stephen Brown, Hillsboro, OR (US); Srikathyayani Srikanteswara, Portland, OR (US); Jessica C. McCarthy, Dublin (IE); Eve M. Schooler, Portola Valley, CA (US); Christian Maciocco, Portland, OR (US); Hassnaa Moustafa, Portland, OR (US); Nageen Himayat, Fremont, CA (US); Rath Vannithamby, Portland, OR (US); David John Zage, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/997,278

(22) Filed: Aug. 19, 2020

(65) Prior Publication Data

US 2021/0105335 A1 Apr. 8, 2021

Related U.S. Application Data

(63) Continuation of application No. 15/414,462, filed on Jan. 24, 2017, now Pat. No. 10,785,341.

(Continued)

(51) Int. Cl.
*H04L 29/08* (2006.01)
*H04L 67/568* (2022.01)

(Continued)

(52) U.S. Cl.
CPC .......... *H04L 67/2842* (2013.01); *G06F 16/23* (2019.01); *G06F 16/9574* (2019.01);

(Continued)

(58) Field of Classification Search
CPC . H04L 67/2842; H04L 29/08; H04L 41/5006; H04L 41/5009; H04L 41/5025;

(Continued)

(56) References Cited

U.S. PATENT DOCUMENTS 8,972,477 B1   3/2015   Taylor
9,052,942 B1   6/2015   Barber et al.

(Continued)

OTHER PUBLICATIONS

"U.S. Appl. No. 15/414,462, Preliminary Amendment Filed Jan. 25, 2017", 9 pgs.

(Continued)

*Primary Examiner* — Tan Doan
(74) *Attorney, Agent, or Firm* — Schwegman Lundberg & Woessner, P.A.

(57) ABSTRACT

Generally discussed herein are systems, devices, and methods for populating a cache in an information-centric network. A device of an ICN can include a content store including published content and attributes of the published content stored thereon, the attributes including at least two of a device from which the content originated attribute, a lineage attribute, and a service level agreement attribute, and content processing circuitry coupled to the content store, the content processing circuitry configured to manage the published content based on the attributes.

20 Claims, 7 Drawing Sheets

Related U.S. Application Data

(60) Provisional application No. 62/424,985, filed on Nov. 21, 2016.

(51) Int. Cl.

| | | |
|---|---|---|
| *G06F 16/23* | (2019.01) | |
| *H04L 67/63* | (2022.01) | |
| *H04L 41/5009* | (2022.01) | |
| *G06F 16/957* | (2019.01) | |
| *H04L 43/16* | (2022.01) | |
| *H04L 67/1097* | (2022.01) | |
| *H04L 69/22* | (2022.01) | |
| *H04L 47/28* | (2022.01) | |
| *H04L 67/10* | (2022.01) | |
| *H04L 67/12* | (2022.01) | |
| *H04L 45/60* | (2022.01) | |
| *H04L 45/74* | (2022.01) | |
| *H04L 47/20* | (2022.01) | |
| *H04L 41/5006* | (2022.01) | |
| *H04L 41/5025* | (2022.01) | |
| *H04L 43/091* | (2022.01) | |
| *H04L 43/12* | (2022.01) | |
| *H04L 61/5076* | (2022.01) | |
| *H04L 67/51* | (2022.01) | |
| *H04L 45/00* | (2022.01) | |
| *H04L 47/783* | (2022.01) | |
| *H04L 65/40* | (2022.01) | |
| *H04L 67/2876* | (2022.01) | |
| *H04L 67/01* | (2022.01) | |

(52) U.S. Cl.
CPC .......... *H04L 29/08* (2013.01); *H04L 41/5006* (2013.01); *H04L 41/5009* (2013.01); *H04L 41/5025* (2013.01); *H04L 41/5035* (2013.01); *H04L 43/12* (2013.01); *H04L 43/16* (2013.01); *H04L 45/04* (2013.01); *H04L 45/14* (2013.01); *H04L 45/60* (2013.01); *H04L 45/74* (2013.01); *H04L 47/20* (2013.01); *H04L 47/286* (2013.01); *H04L 47/783* (2013.01); *H04L 61/2076* (2013.01); *H04L 67/10* (2013.01); *H04L 67/1097* (2013.01); *H04L 67/12* (2013.01); *H04L 67/16* (2013.01); *H04L 67/2876* (2013.01); *H04L 67/327* (2013.01); *H04L 67/42* (2013.01); *H04L 69/22* (2013.01)

(58) Field of Classification Search
CPC ..... H04L 41/5035; H04L 43/12; H04L 43/16; H04L 45/04; H04L 45/14; H04L 45/60; H04L 45/74; H04L 47/20; H04L 47/286; H04L 47/783; H04L 61/2076; H04L 67/10; H04L 67/1097; H04L 67/12; H04L 67/16; H04L 67/2876; H04L 67/327; H04L 67/42; H04L 69/22; G06F 16/9574; G06F 16/23
USPC ....................................................... 709/213
See application file for complete search history.

(56) References Cited

U.S. PATENT DOCUMENTS

| | | | |
|---|---|---|---|
| 9,538,446 B1* | 1/2017 | Kaushik | H04B 17/373 |
| 10,623,408 B1 | 4/2020 | Marshall et al. | |
| 10,785,341 B2 | 9/2020 | Schoenberg et al. | |
| 10,848,584 B2 | 11/2020 | Vannithamby et al. | |
| 2008/0147843 A1* | 6/2008 | Scudder | H04L 45/02 709/223 |
| 2009/0287835 A1* | 11/2009 | Jacobson | H04L 67/1068 709/229 |
| 2011/0138040 A1 | 6/2011 | Kang et al. | |
| 2012/0159176 A1 | 6/2012 | Ravindran et al. | |
| 2013/0219081 A1* | 8/2013 | Qian | H04L 45/02 709/241 |
| 2014/0192717 A1 | 7/2014 | Liu et al. | |
| 2014/0195641 A1 | 7/2014 | Wang et al. | |
| 2014/0269402 A1* | 9/2014 | Vasseur | H04L 41/0659 370/253 |
| 2014/0293805 A1* | 10/2014 | Khaldoun | H04L 45/70 370/252 |
| 2015/0039784 A1 | 2/2015 | Westphal | |
| 2015/0056995 A1 | 2/2015 | Baillargeon | |
| 2015/0106730 A1 | 4/2015 | Wang et al. | |
| 2015/0319241 A1 | 11/2015 | Scott | |
| 2015/0381546 A1 | 12/2015 | Mahadevan et al. | |
| 2016/0021172 A1 | 1/2016 | Mahadevan et al. | |
| 2016/0085830 A1 | 3/2016 | Mahadevan et al. | |
| 2016/0212066 A1 | 7/2016 | Ravindran et al. | |
| 2016/0255180 A1 | 9/2016 | Bae et al. | |
| 2016/0255535 A1* | 9/2016 | De Foy | H04L 67/2847 370/236 |
| 2016/0371190 A1 | 12/2016 | Romanovskiy | |
| 2018/0046667 A1 | 2/2018 | Wood et al. | |
| 2018/0077052 A1* | 3/2018 | Moiseenko | H04L 45/122 |
| 2018/0145907 A1 | 5/2018 | Vannithamby et al. | |
| 2018/0146059 A1 | 5/2018 | Schoenberg et al. | |

OTHER PUBLICATIONS

"U.S. Appl. No. 15/414,459, Non Final Office Action dated Jan. 3, 2020", 14 pgs.
"U.S. Appl. No. 15/414,462, Non Final Office Action dated Jan. 22, 2020", 19 pgs.
"U.S. Appl. No. 15/414,459, Response filed Mar. 16, 2020 to Non Final Office Action dated Jan. 3, 2020", 9 pgs.
"U.S. Appl. No. 15/414,459, Examiner Interview Summary dated Mar. 18, 2020", 3 pgs.
"U.S. Appl. No. 15/414,462, Examiner Interview Summary dated Mar. 27, 2020", 3 pgs.
"U.S. Appl. No. 15/414,459, Final Office Action dated Mar. 27, 2020", 17 pgs.
"U.S. Appl. No. 15/414,462, Response filed Apr. 7, 2020 to Non Final Office Action dated Jan. 22, 2020", 10 pgs.
"U.S. Appl. No. 15/414,462, Notice of Allowance dated May 19, 2020", 5 pgs.
"U.S. Appl. No. 15/414,459, Response filed Jun. 25, 2020 to Final Office Action dated Mar. 27, 2020", 10 pgs.
"U.S. Appl. No. 15/414,459, Notice of Allowance dated Jul. 16, 2020", 9 pgs.
U.S. Appl. No. 15/414,459 U.S. Pat. No. 10,848,584, filed Jan. 24, 2017, Routing in an Information-Centric Network.
U.S. Appl. No. 15/414,462 U.S. Pat. No. 10,785,341, filed Jan. 24, 2017, Processing and Caching in an Information-Centric Network.

* cited by examiner

FIG. 6

CONTENT STORE 600

| CONTENT NAME 602 | DATA 604 |
|---|---|
| /ORG1/DATA1 | DATA1 |
| /ORG1/DATA2 | DATA2 |

FIG. 7

EXTENDED CONTENT STORE 700

| NAME 602 | DATA 604 | LOCATION | SLA 702 | TIME SPAN 704 | DURABLE 706 | LATENCY 708 | DEVICE TYPE 710 | CONTENT TYPE 712/714 |
|---|---|---|---|---|---|---|---|---|
| /ORG1/DATA1 | DATA1 | DEVICE 1 | X% | TIME 1 | Y | TIME 3 | WIRED | STREAM |
| /ORG1/DATA2 | DATA2 | DEVICE 5 | Y% | TIME 2 | N | TIME 4 | WIRELESS | STATIC |

FIG. 8

EXTENDED CONTENT STORE 800

| NAME 602 | DATA 604 | LINEAGE 802 | POPULARITY 804 | DATA LOCATION 806 | TTL 808 | ACCESS 810 | QOS 812 |
|---|---|---|---|---|---|---|---|
| /ORG1/DATA1 | DATA1 | DEVICE 1 | LEVEL 1 | DEVICE 3 | TIME 3 | USER(S) | QOS 1 |
| /ORG1/DATA2 | DATA2 | DEVICE 5 | LEVEL 2 | NONE | TIME 4 | USER(S) | QOS 2 |

PROCESSING AND CACHING IN AN INFORMATION-CENTRIC NETWORK

REFERENCE TO RELATED APPLICATION

This application is a continuation of U.S. patent application Ser. No. 15/414,462, filed Jan. 24, 2017, which claims the benefit of priority to provisional patent application No. 62/424,985, filed on Nov. 21, 2016, each of which is incorporated by reference herein in its entirety.

TECHNICAL FIELD

Embodiments generally relate to network systems and, more particularly, to systems, devices, and methods for populating a cache in an information-centric network (ICN), sometimes called a content centric network (CCN) or named data network (NDN).

TECHNICAL BACKGROUND

A network architecture can include node communication based on Internet Protocol (IP) addresses. This type of architecture is sometimes referred to as a host-oriented network (HON). A HON includes respective conversations between respective source and destination devices, one wishing to access to a resource and one providing access to the resource. IP packets thus identify a source and destination for each packet. A lot of internet traffic is comprised of conversations between sources and destination devices using Transmission Control Protocol (TCP).

This HON may not be a best match for some communications. A lot of internet communications regard access to content irrespective of its location. In an ICN, a data unit is requested, routed, and delivered via its name rather than its address. An ICN architecture may provide more reliable and/or efficient communication between devices as compared to a HON (e.g., under conditions of device mobility and intermittent connectivity). An ICN allows content to be named at a network layer or upper layers disassociating the IP address from the location, as opposed to IP addresses as allowed by the HON.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates, by way of example, a logical diagram of an embodiment of a content store.

FIGS. 7 and 8 illustrate, by way of example, respective logical diagrams of embodiments of extended content stores.

DESCRIPTION OF EMBODIMENTS

Figure 2:
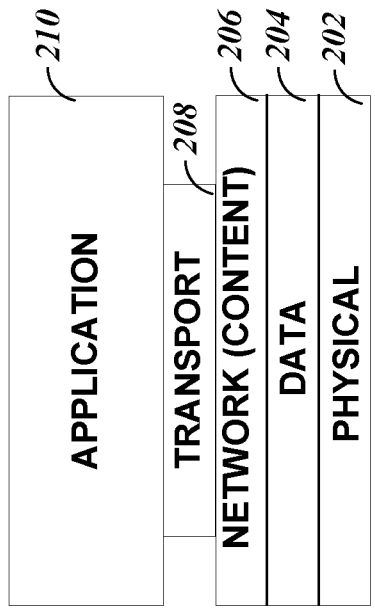
FIG. 2 illustrates, by way of example a logical block diagram of an embodiment of layers of an ICN.

Examples in this disclosure relate to devices, systems, and methods that include populating a cache memory, such as in an ICN node.

ICNs shift the paradigm from node endpoint-addressed routing of data to a routing based on named content. In an ICN, the name of the content is used to route data in response to interests. Since addressing is based on a content name (e.g., an interest name), the source where data is served from becomes secondary in an ICN. This allows for various optimization options, for example caching data natively in the network at "arbitrary" nodes of the system (e.g., any node capable of serving an interest packet). An interest packet can be served from the closest cache source that includes the content requested. The content in the cache could have been moved there pro-actively based on content popularity count, a user's geo-location, least costly in terms of total access latency for devices/users that access the data, bandwidth source, network system optimization and/or reliability/capacity of the cache device.

This sort of "in-network caching" can provide flexibility in what to cache and where, what content to migrate where and when, what to discard and when, or the like. Discussed herein are caching and processing optimizations in ICN to allow for cost efficient and/or storage efficient caching. Such caching techniques can be helpful, especially given the huge amount of data generated by internet of things (IoT) devices, such as can be located at an edge of the network.

In contrast to a HON, in an ICN nodes communicate based on named content, instead of IP addresses. In a HON a packet includes a header that defines a destination and includes a payload (data) to be transported to the destination. In ICN an interest, or content request message, is issued and a content object, or content return message, sometimes called a content packet, is returned. The content of the content packet can reside in and be retrieved from a distributed memory (e.g., distributed caches or other memories).

Some basic differences between a HON and an ICN can include one or more of: (1) They use different name spaces. A HON uses IP address and an ICN uses content names. (2) An ICN includes a security primitive directly at the narrow waist (layer four, the transport layer), such as can include a signed content packet, whereas no such security exists by default at layer four in the HON. (3) A HON sends packets to destination addresses, while an ICN uses Interest packets to fetch Data packets from sources (or intermediate nodes that previously received the data packets from sources or from other relay nodes). (4) A HON has a stateless data plane, while an ICN has a stateful data plane.

An ICN can include network devices, data (sometimes referred to as content), users, original content providers (that can be servers for example for Internet video content or small devices for example for IoT) etc., which may have different storage capabilities and requirements. For example, a first device may have more internal storage than it needs to perform its operations, while a second device in the same network may be able to perform more reliably and/or efficiently with some more storage space available for access by the first device.

Embodiments herein can include an addition and/or a modification to how data is published to one or more memories of an ICN, such as can include a dedicated memory device and/or a memory of an internet of things (IoT) or other processing device of the network. In one or more embodiments, the data (sometimes referred to as content) in a memory (sometimes referred to as a content store) can be stored with attributes. The attributes can indicate a device from which the content originated, a service level agreement (SLA), a time span for the data to remain in the content store, whether the content is durable, an expected response latency, a type indicating whether the device has wired and/or wireless communication capability, a type of content (e.g., whether the content is to be streamed or is static), or other attributes.

In contrast, current ICN content stores do not include such attributes. Such attributes can be used in determining whether the data can be moved to a different content store, such as without violating the SLA, for example. Such attributes can travel with the content, such as to retain attribute information that can be used for determining whether the content can be moved, removed from the content store, and/or otherwise altered (in terms of content and/or location).

A current implementation of a content store (CS) replacement technique in an ICN can include tiers: (1) replace unsolicited content packets, (2) replace expired content packets, and (3) replace oldest content packets (e.g., first in first out (FIFO)). In contrast to the tiered approach, data in a cache can be populated probabilistically, such as discussed herein. In contrast to this deterministic, tiered approach, one or more embodiments discussed herein provide a probabilistic retention. In one or more embodiments, the probabilistic retention can be aligned with a Service Level Agreement (SLA) and/or Service Delivery Agreement (SDA).

An SLA is a contract that defines what a customer will receive from a service provider (either internal or external). The SLA defines the level of service expected from the service provider. An SLA is sometimes referred to as an SDA.

Probabilistic retention can include a more flexible implementation as compared to a tiered retention approach. In the probabilistic retention, different namespaces may have different SLAs, so the CS can be configurable by name prefix and based on the SLA (e.g., /a/b/c has 90% retention, /d/e/f has 99.999%). This raises the problem that the retention policies will collide and that the CS may enter an error state where, for example due to a high volume of traffic, the CS cannot maintain its guarantees (an overbooking problem). This problem exists both when using multiple namespaces and a single namespace. To signal this to the user, a retention-enabled CS can be extended with an application programming interface (API), such as to alert an application and/or user of a failure to maintain SLA requirements.

As previously discussed, a HON is different from an ICN. FIGS. 1-4 describe differences between the HON and the ICN and basic structures that are used in an ICN.

Figure 1:
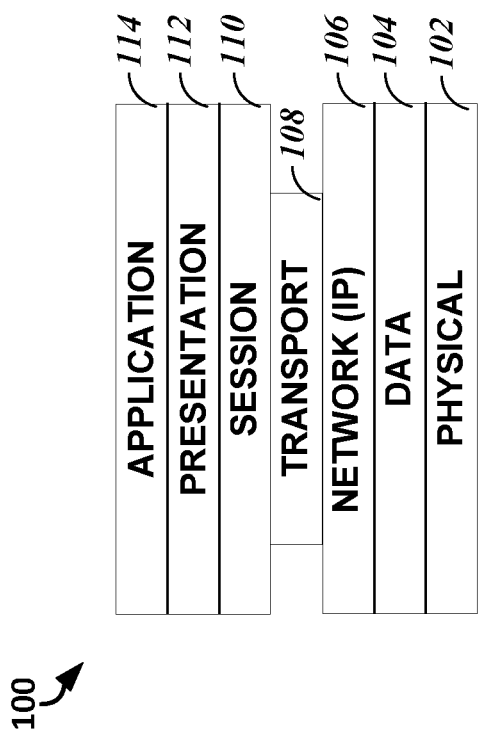
FIG. 1 illustrates, by way of example, a logical block diagram of an embodiment of layers of a HON.

FIG. 1 illustrates, by way of example, a logical block diagram of an embodiment of layers 100 of a HON. FIG. 2 illustrates, by way of example a logical block diagram of an embodiment of layers 200 of an ICN. The stacks illustrated are merely examples and do not preclude ICN from being over lower layers of a network. The typical open systems interconnect (OSI) model is broken into seven layers. The seven layers include the physical layer 102 (layer one), data link layer 104 (layer two), network layer 106 (layer three), transport layer 108 (layer four), session layer 110 (layer five), presentation layer 112 (layer six), and application layer 114 (layer seven). In the seven layer model the physical layer is referred to as layer one and the application layer is layer seven with layers numbered in order therebetween. When an item is said to be in a lower layer, that means that the item is in a layer with a lower number than the layer being referenced. For example, a lower layer relative to the transport layer (layer four) includes the network layer, data link layer, and/or the physical layer. A higher layer relative to the transport layer (layer four) includes the session layer, the presentation layer, and/or the application layer.

The HON layer 100 and the ICN layer 200 include copper, fiber, radio, or the like at a physical layer 102 and 202 (layer one). This layer is the same in both the HON and the ICN. The HON layers 100 as illustrated include a physical layer 202, a data link layer 204, a network layer 206, a transport layer 208, and an application layer 210.

Figure 3:
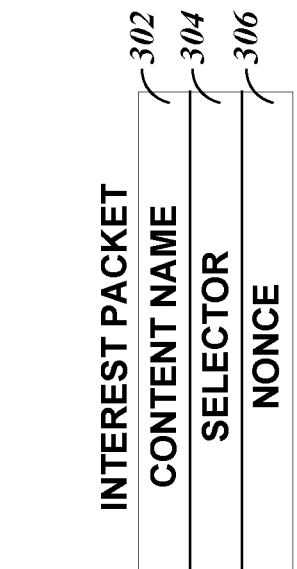
FIG. 3 illustrates, by way of example, a logical block diagram of an embodiment of an interest packet.

In an ICN, an interest packet is issued by a user interested in obtaining content and a data packet including the requested content can be provided to fulfill the interest indicated (by content name) in the interest packet. FIG. 3 illustrates, by way of example, a logical block diagram of an embodiment of an interest packet 300. The interest packet 300 includes fields that allow a user to define the content requested in the interest packet 300. The fields, as illustrated, include a content name 302, a selector 304, and a nonce field 306. A content object can be named, by a content publisher or user, such as by using a hierarchy of binary name segments. A requested content (content identified by content name in an interest packet) need not be perfectly defined. For example, a user can indicate a portion of the content name and use a "wildcard" indicator to identify that the content name is incomplete. In another example, the content name can be complete except for the extension (e.g., ".pdf", ".doc", ".mp3", or the like) and a wild card can be used in place of the extension. In such instances, the router can attempt to retrieve the highest quality format that is available and in a format compatible with the device that issued the interest packet. Attributes of the device are discussed elsewhere herein. The selector allows a user to specify a specific source for the content associated with the content name or otherwise be more specific with regard to a scope of data to be returned in response to the interest packet 300. The nonce field 306 can be used to limit an amount of time the interest packet 300 persists before being discarded, ensure that the content is authentic (e.g., originates from a specified publisher, is a specified version, has not been tampered with or otherwise altered, or the like).

Figure 4:
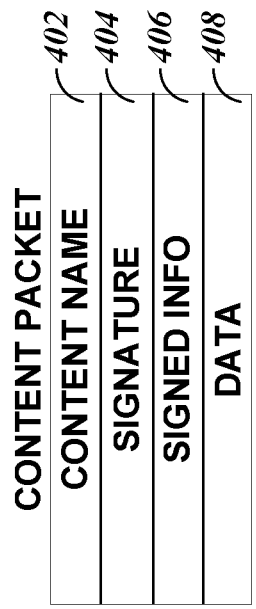
FIG. 4 illustrates, by way of example, a logical block diagram of an embodiment of a content packet.

FIG. 4 illustrates, by way of example, a logical block diagram of an embodiment of a content packet 400. The content packet 400 can include fields that allow a user issuing a corresponding interest packet to verify the content is authentic, provide security for the content requested, and/or provide the requested content to the requester. The fields as illustrated include a content name 402, a signature 404, a signed information 406, and data 408 (e.g., the requested content, such as in an encrypted, compressed, unencrypted, and/or uncompressed format).

The content name 402 can be the same as the content name 302. In some ICN configurations, a user does not need to define a complete content name, and in such instances the content name 302 can be different from the content name 402. The signature 404 can include a cryptographic signature that binds the content name to a payload (the data 408). The user that issued the interest packet 300 can access the data 408 if the user has a key of the publisher, such as can be determined using data from the signature 404 or the signed information 406. In one or more embodiments, the data required to access the content can be provided in the interest packet 300, such as in the nonce field 306. The signed information 406 can include an indication of how the content is compressed or encrypted or data indicating that the content in the data 408 is authentic. The signed information 406 can include an identification of the publisher, a location of a key that can be used to decrypt the data 408 and/or verify the authenticity of the data 408, an amount of time after which (or a specified time at which) the data becomes "stale" (e.g., no longer relevant or superseded by more accurate data), or the like.

The ICN network routes the interest packet 300 and a pending interest table (PIT) of the interest packet 300 (not shown) is updated to record a path of the interest packet 300 through the network. After finding a content object that includes a name that sufficiently matches the name specified in the interest, the content object is routed back to the issuer, such as in the content packet 400, by reversing the path specified in the PIT (in current ICN routing techniques).

Current ICN routing and storage devices operate independent of (1) attributes of the content, (2) attributes of the devices sending and receiving content, and (3) attributes of the applications utilizing ICN. This independence can cause a sub-optimal selection of where the content is stored in the network.

Some studies have concluded that cost increases above proportionally for increased reliability, performance or service guarantees. In real-time operating systems, this fact is exploited, such as by overbooking of resources, such as if it is acceptable to miss a deadline, such as due to insufficient resources. Airlines are using similar principles when overbooking airlines. By this same principle, when caching takes place inside the network, it is common for several types of traffic to compete for the same caching resources, and cache space management becomes more difficult to address with increased demand. These overbooking principles can be used in populating content stores (CS) in one or more embodiments. Content properties (e.g., high/low importance), as defined by a user or administrator or other properties, such as popularity count of the content or geo-location of an interest requester can influence the caching decision as, for example, smaller caches near the end users might be out of space. Algorithms, heuristics, or machine learning algorithms, such as can be implemented on cache populating circuitry, can populate the caches with content, such as to better serve the end user, such as to reduce access latency (e.g., time from interest issuance to interest satisfaction). The circuitry can operate in the background (out of view of a user).

One or more embodiments herein, regard increasing optimization, efficiency, and/or reliability of caching in an ICN. One or more embodiments regard a probabilistic approach, such as using by statistical distributions and/or accepted probabilities under which data loss is accepted. One or more embodiments regard clustering and/or organizing caches and/or compression schemes that increase the ability of the caches to store more relevant data and/or reduce less relevant stored in the caches. One or more embodiments regard determining available space in neighbor or neighborhood caches and moving or copying data to such neighbor or neighborhood caches, such as can be helpful for load balancing, improved access latency, or the like.

Current solutions discard data in caches based on the time to live (TTL), but not on a probabilistic retention model. Hence, if data sets with similar properties (e.g., 100 photographs of the same object) exist where only one data set is used or needed, all data sets exist for the specified time. The proposed approach allows systems to discard some of the cached data if the space is needed to fulfill other services, such as can help provide a more efficient cache management system or a cache management system that reduces or minimizes a number of SLAs that are violated.

Also, current solutions do not consider real-time information on the neighboring caches, the content attributes, caching capabilities, and/or popularity of the content when storing data. If there are multiple similar data sets. Popularity count of the cached content is a distributed property that doesn't have to be strictly consistent. Geo-location of the users similarly does not have to be strictly consistent. These types of properties could be eventually consistent instead of strictly consistent, such as if the goal is to detect a trend. (Note: Other distributed properties of the cached content such as the ones enabling usage-based-charging would have to be strictly consistent in order to have an accurate charging/billing of the end-user and hence will incur additional complexity and latency to achieve strict consistency).

Figure 5:
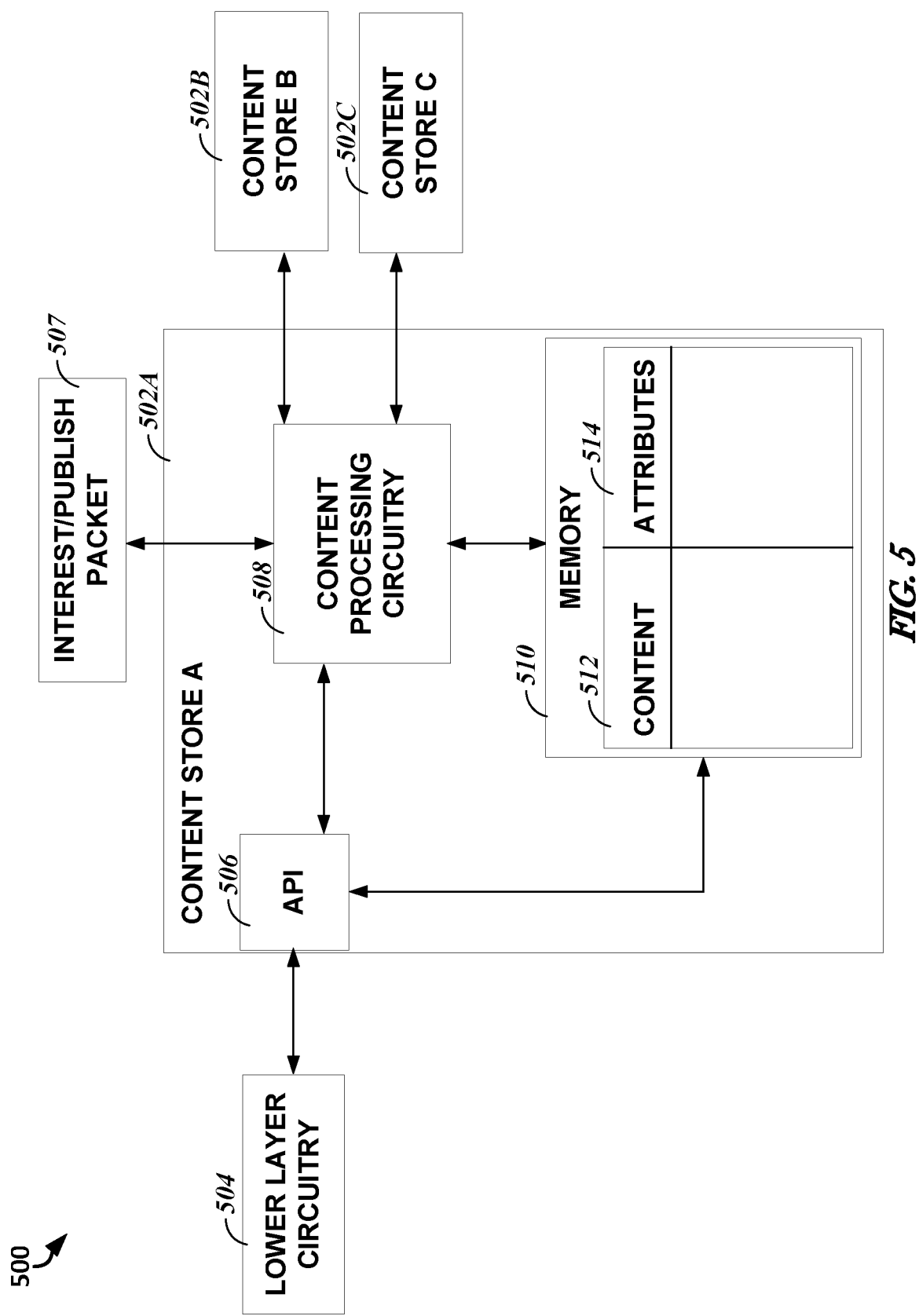
FIG. 5 illustrates, by way of example, a logical block diagram of an embodiment of a system for populating memories of an ICN.

FIG. 5 illustrates, by way of example, a logical block diagram of an embodiment of a system 500 for populating memories of an ICN. The system 500 as illustrated includes a plurality of content stores 502A, 502B, and 502C, lower layer circuitry 504, and interest/publish packets 507. The content store 502A is shown in an exploded view to illustrate components of the content store 502A. Any of the other content stores 502B-C can include similar components, such as to perform similar or the same operations. The content store 502A as illustrated includes an API 506, content processing circuitry 508, and a memory 510. The content store 502A receives published content or content to be published, attributes, and interest/publish packets 507. The content processing circuitry 508 determines where to store the content, such as locally in the memory 510, or remotely in a different memory, such as in the content store 502B-C.

The content processing circuitry 508 can include electric or electronic components, such as can include one or more transistors, resistors, capacitors, inductors, diodes, regulators (e.g., current, voltage, and/or power regulators), multiplexers, logic gates, switches, buffers, amplifiers, oscillators, modulators, demodulators, interconnects (e.g., wired or wireless signal transfer mechanisms), antennas, radios (transmit and/or receive radios) or the like. The content processing circuitry 508 can include an application specific integrated circuitry (ASIC), a programmable gate array (e.g., a programmable chip, such as can include a field programmable gate array (FPGA)), or the like. The content processing circuitry 508 can be configured as a state machine configured to receive one or more attributes of the content stores 502A-C and/or content as inputs and produce a result indicating which content store 502A-C is to store the content, which content to remove from the content store 502A-C, or the like.

The router A 502A, as illustrated, further includes a memory 510 that includes content 512 and attributes 514 associated with the content 512. The attributes 514 include data that can be used by the content processing circuitry 508 to determine whether to retain, remove, compress, modify, move, and/or copy the content 512 associated with the attributes 514.

The API 506 provides an interface through which the lower layer circuitry 504 can communicate with the content store A 502A and vice versa. The API 506 provides a layer of abstraction such that the content store 502A does not need to know what format data provided to the lower layer circuitry 504 needs to conform to and vice versa.

The lower layer circuitry 504 includes circuitry to implement one or more of the layers 202, 204, and 206. The lower layer circuitry 504, in one or more embodiments, can include electric or electronic components, such as can include components similar to that discussed with regard to the content processing circuitry 508. The lower layer circuitry 504 can monitor attributes of content and/or attributes of devices connected to the network and provide such attributes to the content processing circuitry 508, such as through the API 506.

The content processing circuitry 508 can record updates to the content 512 and/or attributes 514, such as can be provided by the lower layer circuitry 504 through API 506 or by the content processing circuitry 508. The content processing circuitry 508 can, in one or more embodiments, periodically poll the lower layer circuitry 504 for attribute information that can be used in the analytics, stored in the attributes 514, and/or forwarded to the content processing circuitry 508, such as to be used in determining which of the content stores 502A-C on which the content 512 is to be stored. The content processing circuitry 508 can, in one or more embodiments, poll the lower layer circuitry 504 in response to occurrence of one or more specified events. The events can include a node providing an indication that the node is leaving the network or is otherwise becoming inaccessible, a specified time elapsing since a last attribute request, a content store or other device query including a request for data or attributes not available at the content store, or other event. The content processing circuitry 508 can manage the content 512 and the attributes 514 of the memory 510. In one or more embodiments, the API 506 can perform operations of the content processing circuitry 508, such as manage the content 512 and/or the attributes 514 of the memory 510. The content processing circuitry 508 can decide a node at which to store the content and which content store of the node to store the content on.

FIG. 6 illustrates, by way of example, a logical diagram of an embodiment of a content store 600. The content store 600 as illustrated includes content stored by content name 602 and corresponding data 604. The content name 602 defines how the content can be requested. The data 604 can be encrypted, compressed, or otherwise stored in a specified format, such as can be specified in the content packet 400.

FIGS. 7 and 8 illustrate, by way of example, respective logical diagrams of embodiments of extended content stores 700 and 800. The extended content stores 700 as illustrated include the content name 602 and the data 604 along with a plurality of attributes of the content corresponding to the content name 602.

The extended content store 700 as illustrated includes attributes including a location attribute 702 of a device that published the content, an SLA attribute 704 associated with the content, a time span attribute 706 in which the content is relevant, a durability attribute 708 of the content, a latency attribute 710 of the content, a device type attribute 712 that indicates a type of device (e.g., wired, wireless, and/or the like) that published the content or of the content store on which the extended content store 700 resides, and a content type attribute 714 (e.g., streaming or otherwise dynamic, or static). The SLA attribute 704 attribute can indicate a percentage over which the time span attribute 706 is valid. The time span attribute 706 indicates a time frame over which the SLA attribute 704 is valid and/or the data is to be retained. The durability attribute 708 indicates whether the data is to persist in the content store over restarts. The latency attribute 710 indicates a maximum allowed time for data retrieval from the content store. If the latency attribute 710 is sufficiently high the content can be moved to a content store that takes longer to access. The device type attribute 712 can indicate communication capabilities (e.g., wired or wireless communication of the device), whether the device is a dedicated memory or whether the device performs operations other than storing content (such as gathering data using a sensor, such as can include an IoT device). The content type attribute 714 indicates whether the data is for streaming or static presentation.

The extended content store 800 as illustrated includes a plurality of attributes including lineage attribute 802, a popularity attribute 804, a content location attribute 806, a time-to-live (TTL) attribute 808, an access attribute 810, and a quality of service (QoS) attribute 812. The lineage attribute 802 is populated with data regarding which devices contributed to the content, names of the original content and/or other names that have been associated with the content, locations of the original content, or the like. The popularity attribute 804 can indicate, relative to other similar content or any other content, how many times the content, or a portion thereof, is requested in an interest packet and/or provided in response to an interest packet. The content location attribute 806 indicates an additional location of the same content or a portion of the content. The content location attribute 806 can indicate another device and/or what portion of the content is stored at that location (if only a portion of the content is stored at the location). Such locations can provide redundancy, such as to help ensure that the data will remain accessible. Since nodes can leave the network, redundant data storage can help ensure the data remains accessible to nodes that remain in the network. The TTL attribute 808 indicates a time after which the data is no longer valid or the data is superseded by newer data. The access attribute 810 indicates which user(s) have permission to access the data and what type of access (e.g., read, write, and/or copy, or the like) each user is allowed. The QoS attribute 812 indicates a relative priority of the content. The QoS attribute 812 affects traffic prioritization and/or resource reservation, such as to help guarantee a certain level of performance in terms of latency, time from interest issuance to fulfillment, resolution of content provided, throughput, jitter, error rate, or the like.

The attributes of the extended content store 800 and 700 are optional. The content store 502 can include any of the attributes of the extended content store 700 and/or 800 individually or in combination.

Figure 9:
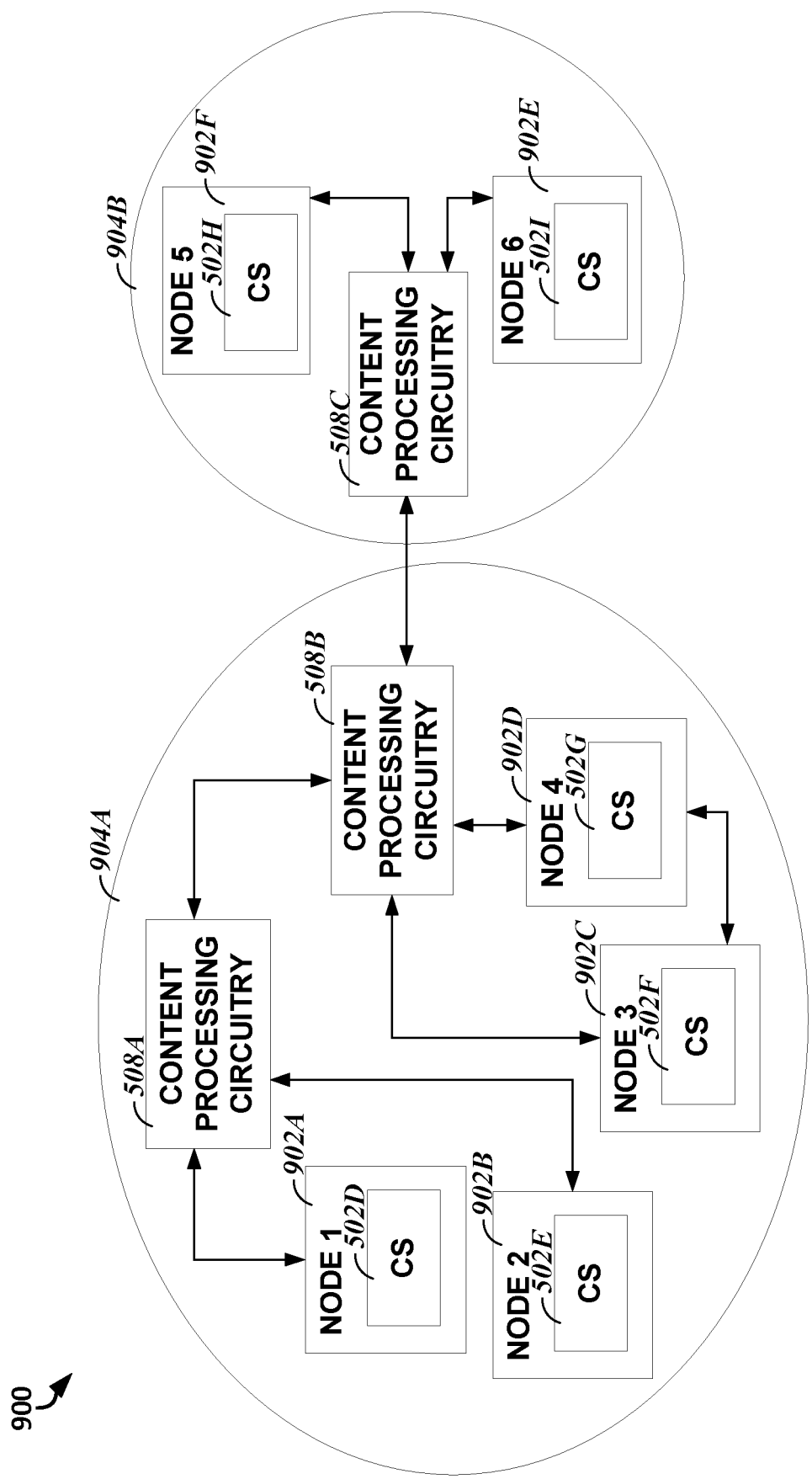
FIG. 9 illustrates, by way of example, a logical block diagram of an embodiment of a multi-network system with content processing circuitry.

FIG. 9 illustrates, by way of example, a logical block diagram of an embodiment of a multi-network system 900 with content processing circuitry 508A, 508B, and 508C. The multi-network system 900 as illustrated includes two networks 904A and 904B that can communicate with one another. Each of the networks 904A-B includes nodes 902 and content processing circuitry 508. Each of the nodes 902D, 902E, 902F, 902G, 902H, and 902I includes a content store (CS) 502D, 502E, 502F, 502G, 502H, and 502I. The content processing circuitry 508A-C is implemented outside of a content store in the system 900. In contrast, the content processing circuitry 508 of the system 500 is implemented in the content store 502A. The content processing circuitry 508A-C is more centralized compared to the more distributed solution illustrated in FIG. 5.

The network 904A as illustrated includes the nodes 902A-902B communicatively coupled to the content processing circuitry 508A. The content processing circuitry 508A can access attributes, such as can be stored in a memory of the node 902A-902B, the node on which the content processing circuitry 508A resides, or a dedicated repository (not shown in the FIGS.). The content processing circuitry 508A can manage the content on the content store 502D-502E, such as by issuing a command to the node to remove content, modify content, compress content, or the like. The content processing circuitry 508A can monitor whether or not the network 904A is satisfying an SLA. The content processing circuitry 508A, in response to determining an SLA has been violated, can cause a notification to be issued to a subscriber associated with the SLA that has been violated.

The content processing circuitry 508 can handle content by first, replacing content that is no longer under an SLA (an SLA has expired) and second, replacing content that has expired (a time-to-live (TTL) has expired). If neither of the first and second operations are possible, the content processing circuitry 508 can determine whether another content store 502F, 502G, 502H, and 502I (or other content store) has sufficient space to store the data, such as with a guarantee of a minimum access latency as can be defined in the SLA. If such space is not available that can still satisfy the SLA, the content processing circuitry 508A can cause the notification to be issued to the subscriber associated with the SLA.

The content processing circuitry 508A-C can migrate data to a more capable and/or more available content store 502D-H. Such a migration can include a sort of reverse CDN in which data moves from an edge device, to a backend cloud, rather than from the backend cloud to the edge device, such as in a CDN. Such a migration of data can help more content stores meet SLA requirements. The content stores 502D-H can, through the content processing circuitry 508A-C, share attributes with one another. The attributes provided can be used to help ensure that the migration remains consistent with regard to an ability to satisfy SLAs. For example, in migrating content from a first CS to a second CS, attributes of the content can be read and the content processing circuitry 508 can determine whether the second CS is sufficiently likely to satisfy the SLA, QoS, latency, or other attribute(s). The attributes stored with the content in the first CS can be migrated with the content, such as to be stored with the content in the second CS.

Using IoT nodes, data generally flows from the edge (e.g., the IoT device) towards the center of the network. Due to the volume of data produced by these devices that will flow into the network, it can be beneficial to reduce a size of the data, such as by aggregation, compression, subsampling the data, or the like. As the data is changed, the name of the data can change as well. These changes in the data can be recorded, such by using the lineage attribute 802. The lineage attribute 802 can indicate the device(s) from which the data originated or other attributes of the content from which the data originated, and/or what type of operations were performed on the data, such as to reduce the size of the data.

Renaming the content can be performed in a manner that somehow indicates the data that was used to create the content. For example, the name can include a concatenation of at least a portion of the name(s) of the content used to create the new content. In this manner, a user that issues an interest packet for data that has been combined with other data and/or altered can receive the combined and/or altered data. The content routers, in such examples, can search the name and/or attributes, such as can be stored in a forwarding information base (FIB), to determine whether the content matches the content name in the interest packet.

As is previously discussed, the lineage attribute 802 can indicate whether the data was compressed or otherwise modified. Wildcard searching can be used to find data that has been compressed, combined, or otherwise modified if the naming convention of the content keeps the names of the original content and the content as modified sufficiently similar.

The data from devices, as previously discussed can be merged or aggregated, such as to reduce an overall size of the data. For example, consider an embodiment in which the nodes 902A-D are cameras, each capturing a specific perspective. A field of view of two or more of the cameras can overlap. Consider a node that is interested in only a particular view or section of the field of view of all the cameras. The node 902A-F can stitch together the scenes with the overlap, thus creating a scene with data that comprises less data than the two scenes individually. The node can then publish the combined scene. The name and/or attributes of the individual scenes can be recorded in the lineage attribute 802. The name of the new combined scene can be a combination of the two previous scenes, such that a search for either of the scenes used to create the combined scene will return the combined scene. In one or more instances, combining names of content used to create new content may not be practical, such as if tens, hundreds, or more items of content are combined to create new content. In such embodiments, the name of the content may not reflect the names of the content and the lineage attribute 802 may include the content names, attributes, indication of how the data was combined, a type of compression used on the combined content, or other information regarding the combination of the content.

In one or more embodiments, content may not fit in a CS and may be split into multiple, individual items of content. The individual items of content may be stored on separate CSs. The CSs on which the data is stored can include attributes (relative to a subscriber) sufficient to satisfy the SLA, QoS, or other requirements as can be recorded as attributes stored or otherwise associated with the content. The lineage attribute 802 can include data indicating that the content is only partial and which other CS(s) include data of the content.

As previously discussed, content can reside on multiple CSs. This can be done not only for redundancy reasons, but additionally or alternatively for CS space, SLA satisfaction, QoS satisfaction, or other reason(s). For example, multiple users in respective different locations, may require a specified QoS or SLA. It may be beneficial, for satisfaction of the QoS and/or SLA to copy the data to a CS near each of the users with the QoS and/or SLA requirement. Such copying or migration may be beneficial in an example in which a node is to process the data. The data can be copied to a CS near that node that processes the content. Such copying or migration can be beneficial for publishing the content, such that the data is more efficiently provided in a CS near a publishing node.

Consider the system 900. The system 900 as illustrated includes two separate networks 904A-B. The networks 904A-B can each define a pool of CS resources, such as to provide a distributed memory cluster for the devices of the corresponding network 904A-B. ICNs move away from a traditional cloud/server based model as is used in HONs. Current ICN in-network caching mechanisms do not account for hardware constraints and/or consider the suitability of the offered advantages offered by ICN caching mechanisms as they apply to the network edge and when dealing with relatively large amounts of IoT data. Using attributes, an API, and/or the CSs can be federated. The federated memories can provide a pool of CS resources for each network. For example, the CS 502D-G can be federated, such as through the content processing circuitry 508A and/or 508B, such as to provide a distributed memory for the network 904A. In the cluster, adjacent nodes share a common CS resource pool, such as can increase the individual storage capabilities.

In one or more embodiments, each of the networks 904A-B can represent a memory cluster that share respective CS pools. Such CS pools can form a sort of cloud of CS resources, such as at an edge of a network. This arrangement of CS pools can be dynamic and reconfigured as devices (e.g., nodes 902A-F) enter and exit the network 904A-B. Within one memory cluster, the memory of each node is called its content store (CS) 502D-I. All the nodes combine their CSs to store what they all want to access. In other words, within memory cluster A (e.g., the network 904A), there can be repetition of content. An assumption, in some embodiments, can include that the nodes 902A-F of each network 904A-B are close enough that there is sufficiently low latency overheard and the communication links of the nodes 902A-D can support the local movement of data. Local as in within the network 904A-B.

One or more of the content stores 502A-I can be configured as an extended content store, such as that shown in and discussed with regard to FIGS. 7-8. Each of the extended content stores can be populated (e.g., only) with data for the memory cluster to which the CS belongs. A node 902A-F with insufficient memory can store data in another CS of the cluster to which the CS belongs. For example, the node 902A can store data in the CS 502E, such as if the CS 502D has insufficient space, the node 902B processes the data of the content, the node 902B provides better access, such as to meet an SLA, QoS, link latency, or other requirement, and/or the content is to be combined with data in the CS 502E.

While pooling resources, such as CSs to form a distributed memory for a cluster, can increase an individual memory capacity of the nodes, the memory may still be relatively limited. Such limited memory or limited compute resources of the cluster can be generally used up by too much access to the memories. To limit the amount of data stored, or to otherwise prioritize what is stored in the cluster, a context-selective data process can be performed on the content in the CSs. This context-selective reduction can be based on attributes associated with the data, such as the popularity attribute (e.g., content with a popularity above (or equal to) a specified threshold can be retained while popularity below (or equal to) the specified threshold is removed (e.g., moved elsewhere, deleted, or otherwise removed from the cluster)), whether the data is redundant (e.g., whether the content location attribute 806 indicates the content is stored elsewhere, such as within the cluster) such that redundant data can be removed, whether a TTL attribute 808, time span attribute 706, and/or other attribute indicates that the content is still required to meet an SLA or is still relevant, or the like.

This context-selective data process can be performed before or after the content is stored on a CS of the cluster. One or more attributes listed in an attribute field or an attribute selection field can be used in determining whether to retain content.

This context-selective approach to data retention is different from context-agnostic compression which reduces a total size of a cache by compressing the content regardless of context. Devices can individually or collectively pre or post process content in the CS and provide only those portions of content that are most relevant (e.g., stored in the CS after the content-selective data compression). For example, consider a cluster of nodes that performs audio recording and/or recognition. There can be a large amount of data collected, and caching and streaming the content can require significant resource consumption, such as beyond the capabilities of the nodes in the cluster. Based on one or more attribute heuristics and/or a history of interest packets, the nodes can filter out the less requested information and keep content of interest. For example, certain types of meetings or a subset of sound types can be kept based on the heuristics.

The pre-processing may require computing capability beyond that capable of a particular device. To help provide faster processing and/or in-time delivery, multiple devices can form a cluster and collectively process the data together. Not only the storage may be distributed (such as in a probabilistic manner) and/or collaborative, the context-based content reduction can be distributed and/or collaborative.

Figure 10:
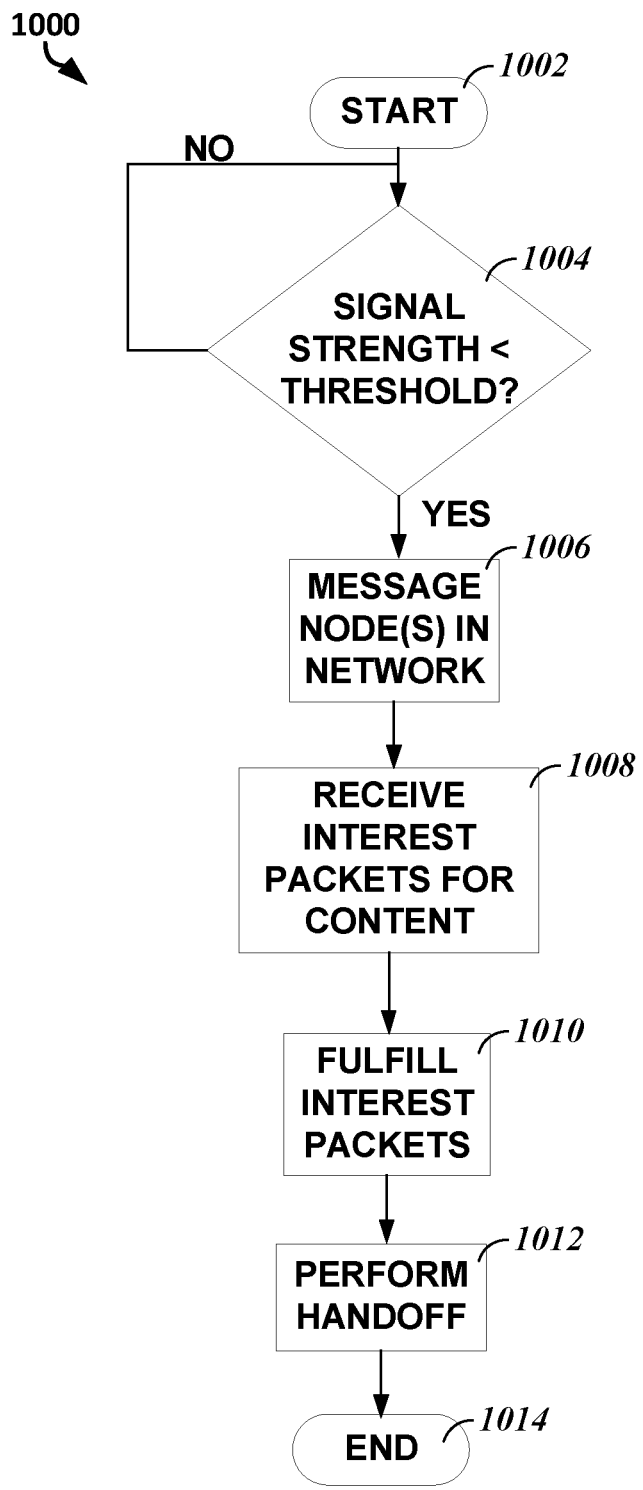
FIG. 10 illustrates, by way of example, a diagram of an embodiment of a method for retrieving content from a device that is about to leave a network or cluster from the perspective of the device that is about to leave the network or cluster.

FIG. 10 illustrates, by way of example, a diagram of an embodiment of a method 1000 for retrieving content from a device that is about to leave a network or cluster from the perspective of the device that is about to leave the network or cluster. The method 1000 can be performed by a node of a network and/or a cluster of nodes that is about to leave the network or cluster of nodes. A "cluster of nodes" as used herein includes a plurality of nodes cooperating to share resources. Nodes of the cluster can access resources of other nodes of the same cluster as if they were their own resources. For example, a node of a cluster could send instructions to processing circuitry of another node of the cluster to perform one or more operations on data, or each node of the cluster can include a portion of a distributed memory. A distributed memory includes a plurality of memories with a universal address space (universal only within the plurality of memories), such that a request to access a specific address from one node results in an access of a same address space as a request to access the same address from another node of the cluster.

The method 1000 as illustrated includes beginning, at operation 1002; determining whether a signal strength (e.g., between two nodes, a node and an Access Point, a node and a cell tower, or the like) is less than (or equal to) a threshold, at operation 1004; messaging node(s) in a same network as the device performing operation 1004, at operation 1006; receiving one or more interest packets for content, at operation 1008; fulfilling the interest packet requests, at operation 1010; performing a handoff of the device, at operation 1012; and ending, at operation 1014. In response to determining the signal strength is not less than (or equal to) the specified threshold, at operation 1004, the operation 1004 can be performed. The specified threshold, at operation 1004, can be greater than a minimum signal strength required to communicate with other nodes of the cluster. The specified threshold can be greater than a signal strength at which the node is to perform a handoff. Additionally or alternative to the operation 1004, the node can determine that it is about to go to sleep and/or that a battery level of the device is below a specified threshold and will not be accessible for some specified time. The operations 1006, 1008, 1010, 1012 and 1014 can be performed in response to the node determining it will go to sleep.

The operation 1006 can include indicating to other nodes of the cluster that the node will be leaving the cluster. The interest packets at operation 1008 can include requests for content stored on the node that is leaving the cluster. The nodes that issue the interest packets can determine which content is stored on the node leaving the cluster by reading the content location attribute 806 and/or lineage attribute 802 of their extended content store. The node leaving the cluster can fulfill the requests indicated by the interest packets and perform operation to leave the network.

Figure 11:
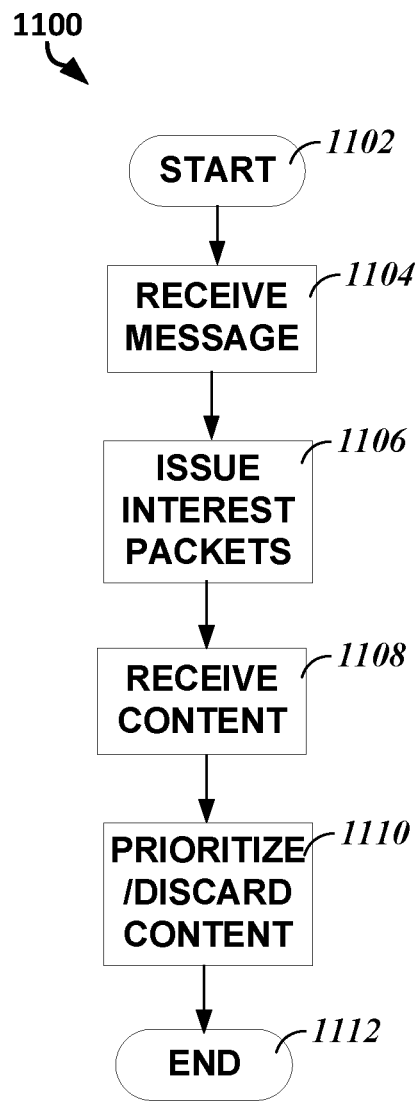
FIG. 11 illustrates, by way of example, a diagram of an embodiment of a method for retrieving content from a device that is about to leave a network or cluster from the perspective of a device that is retrieving data from the device that is about to leave the network or cluster.

FIG. 11 illustrates, by way of example, a diagram of an embodiment of a method 1100 for retrieving content from a device that is about to leave a network or cluster from the perspective of a device that is retrieving data from the device that is about to leave the network or cluster. The method 1100 as illustrated includes beginning, at operation 1102; receiving a message indicating that a node of a cluster will be leaving the cluster or otherwise unavailable (e.g., temporarily unavailable) to the other nodes of the cluster, at operation 1104; issuing interest packets for content stored on the node that will be unavailable, at operation 1106; receiving the requested content, at operation 1108; prioritizing and/or discarding content, such as by performing a context-selective data compression, at operation 1110; and ending, at operation 1112.

The operation 1106 can include providing one or more interest packets for data used by the other node(s) of the cluster (the nodes that are not leaving the cluster). The operation 1110 is optional and can be performed if there is insufficient memory in the cluster to store the content requested at operation 1106. If a node leaves the cluster, such as without issuing a message (e.g., operation 1006), other nodes of the cluster can access a redundant version of the content, such as can be indicated in a lineage attribute 802 and/or other content location attribute 806 of an extended content store. The device type attribute 712 can be used to determine whether to store data on the corresponding device. A device that is wired (and not wireless) can be chosen to store more important content (data that is more popular or used by the nodes of the cluster, such as in performing operations). A wireless device can be more likely to be unavailable, thus a wired node can provide a more reliable content store than a wireless node.

Figure 12:
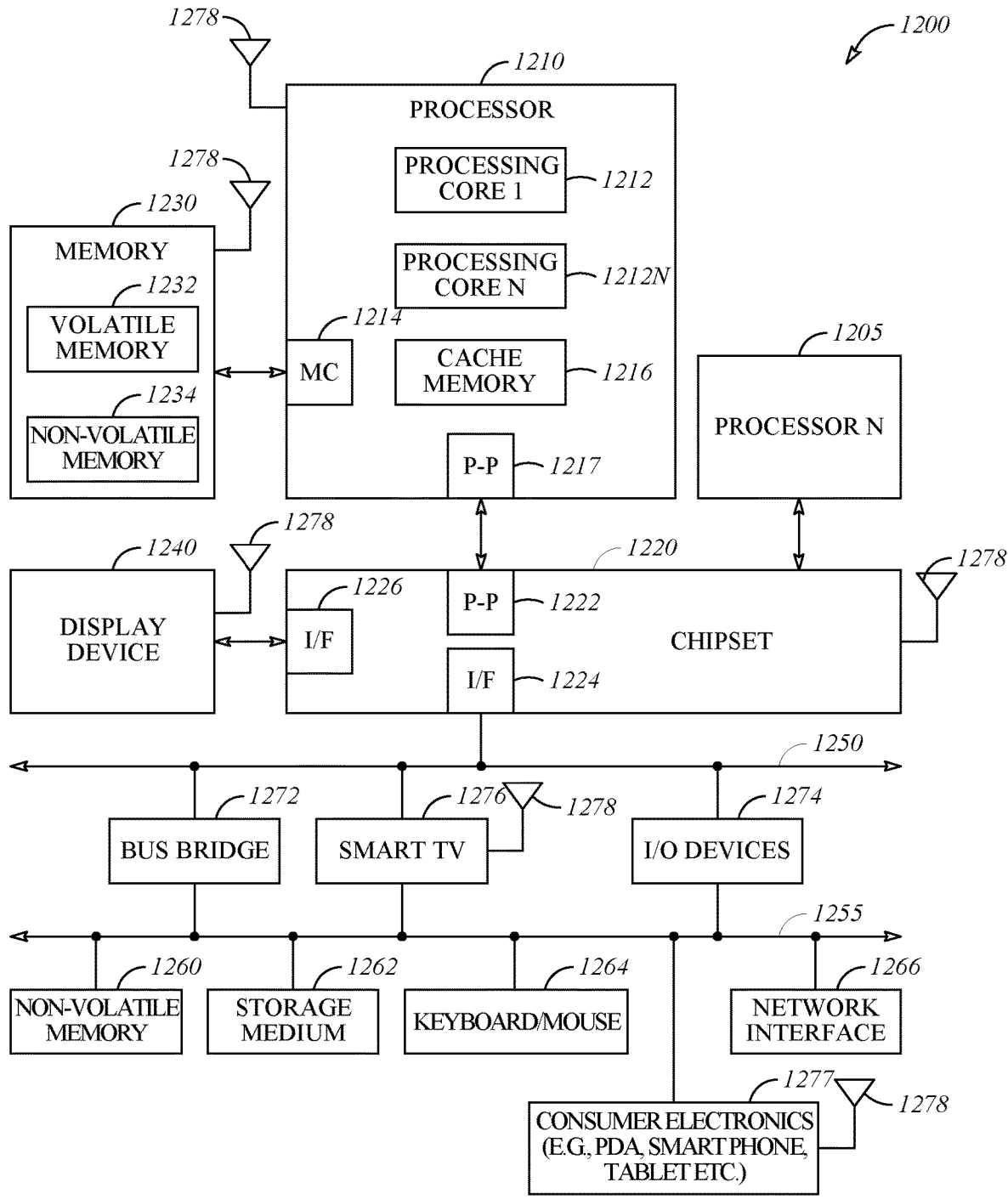
FIG. 12 illustrates, by way of example, a logical block diagram of an embodiment of a system.

FIG. 12 illustrates, by way of example, a logical block diagram of an embodiment of a system 1200. In one or more embodiments, the system 1200 includes one or more components that can be included in the node 902A-F, content processing circuitry 508, API 506, and/or lower layer circuitry 504.

In one embodiment, processor 1210 has one or more processing cores 1212 and 1212N, where 1212N represents the Nth processing core inside processor 1210 where N is a positive integer. In one embodiment, system 1200 includes multiple processors including 1210 and 1205, where processor 1205 has logic similar or identical to the logic of processor 1210. In some embodiments, processing core 1212 includes, but is not limited to, pre-fetch logic to fetch instructions, decode logic to decode the instructions, execution logic to execute instructions and the like. In some embodiments, processor 1210 has a cache memory 1216 to cache instructions and/or data for system 1200. Cache memory 1216 may be organized into a hierarchal structure including one or more levels of cache memory. One or more of the CS 502A-I can be implemented as cache memories.

In some embodiments, processor 1210 includes a memory controller 1214, which is operable to perform functions that enable the processor 1210 to access and communicate with memory 1230 that includes a volatile memory 1232 and/or a non-volatile memory 1234. In some embodiments, processor 1210 is coupled with memory 1230 and chipset 1220. Processor 1210 may also be coupled to a wireless antenna 1278 to communicate with any device configured to transmit and/or receive wireless signals. In one embodiment, the wireless antenna interface 1278 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 1232 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1234 includes, but is not limited to, flash memory, phase change memory (PCM), read-only memory (ROM), electrically erasable programmable read-only memory (EEPROM), or any other type of non-volatile memory device.

Memory 1230 stores information and instructions to be executed by processor 1210. In one embodiment, memory 1230 may also store temporary variables or other intermediate information while processor 1210 is executing instructions. The memory 1230 is an example of a machine-readable medium. While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the content processing circuitry 508) and that cause the machine to perform any one or more of the techniques of the present disclosure, or that is capable of storing, encoding or carrying data structures used by or associated with such instructions. In other words, the various circuitry discussed herein can include instructions and can therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In the illustrated embodiment, chipset 1220 connects with processor 1210 via Point-to-Point (PtP or P-P) interfaces 1217 and 1222. Chipset 1220 enables processor 1210 to connect to other elements in system 1200. In some embodiments of the invention, interfaces 1217 and 1222 operate in accordance with a PtP communication protocol such as the Intel® QuickPath Interconnect (QPI) or the like. In other embodiments, a different interconnect may be used.

In some embodiments, chipset 1220 is operable to communicate with processor 1210, 1205N, display device 1240, and other devices. Chipset 1220 may also be coupled to a wireless antenna 1278 to communicate with any device configured to transmit and/or receive wireless signals.

Chipset 1220 connects to display device 1240 via interface 1226. Display device 1240 may be, for example, a liquid crystal display (LCD), a plasma display, cathode ray tube (CRT) display, or any other form of visual display device. In some embodiments of the invention, processor 1210 and chipset 1220 are merged into a single SOC. In addition, chipset 1220 connects to one or more buses 1250 and 1255 that interconnect various elements 1274, 1260, 1262, 1264, and 1266. Buses 1250 and 1255 may be interconnected together via a bus bridge 1272. In one embodiment, chipset 1220 couples with a non-volatile memory 1260, a mass storage device(s) 1262, a keyboard/mouse 1264, and a network interface 1266 via interface 1224 and/or 1204, etc.

In one embodiment, mass storage device 1262 includes, but is not limited to, a solid state drive, a hard disk drive, a universal serial bus flash memory drive, or any other form of computer data storage medium. In one embodiment, network interface 1266 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the components shown in FIG. 12 are depicted as separate blocks within the system 1200, the functions performed by some of these blocks may be integrated within a single semiconductor circuit or may be implemented using two or more separate integrated circuits. For example, although cache memory 1216 is depicted as a separate block within processor 1210, cache memory 1216 (or selected aspects of 1216) can be incorporated into processor core 1212.

EXAMPLES AND NOTES

The present subject matter may be described by way of several examples.

Example 1 can include a device of an information-centric network, the device comprising a content store including published content and attributes of the published content stored thereon, the attributes including at least two of a device from which the content originated attribute, a lineage attribute, and a service level agreement attribute, and content processing circuitry coupled to the content store, the content processing circuitry configured to manage the published content based on the attributes.

In Example 2, Example 1 can further include, wherein the attributes further include at least two of a durability attribute indicating whether content is to be retained when the device is powered off, a device type attribute indicating whether the device is capable of wireless communication, a quality of service attribute, a popularity attribute indicating how many users access the content relative to other content in the content store, a latency attribute that indicates an amount of time it takes to communicate data, a bandwidth attribute that indicates a spectral or temporal availability of a link, and a content type attribute that indicates whether content is for streaming or static display.

In Example 3, at least one of Examples 1-3 can further include, wherein the content processing circuitry configured to manage the published content includes the content processing circuitry configured to remove first data with associated with a first service level agreement that has expired and after removing the first data, remove second data with an associated time-to-live that has expired.

In Example 4, Example 3 can further include, wherein the content processing circuitry is further configured to after removing the second data, determine that there is insufficient space in the content store to store new data, and remove third data associated with a second associated service level agreement that has not expired.

In Example 5, Example 4 can further include, wherein the content processing circuitry is further configured to issue an alert to a subscriber indicating that the second service level agreement has been violated.

In Example 6, at least one of Examples 1-5 can further include, wherein the content processing circuitry is further configured to issue a message to other nodes of a cluster indicating that the device is going to be unavailable, receive, from the other nodes, one or more interest packets for content stored on its content store, and provide the content indicated by the one or more interest packets to the other nodes of the cluster.

In Example 7, Example 6 can further include, wherein the content processing circuitry is further configured to determine at least one of (1) a signal strength of a signal from the node is less than a signal strength threshold, (2) a battery level of the node is less than a battery threshold, and (3) the device will be put in a sleep mode in a specified amount of time.

In Example 8, Example 7 can further include, wherein the content processing circuitry configured to issue the message to the other nodes includes the content processing circuitry configured to issue the message in response to the determining at least one of (1) a signal strength of a signal from the node is less than a signal strength threshold, (2) a battery level of the node is less than a battery threshold, and (3) the node will be put in a sleep mode in a specified amount of time.

In Example 9, Example 8 can further include, wherein the content processing circuitry is further configured to after providing the content indicated by the one or more interest packets to the other nodes of the cluster, perform a handoff to a network different from the network to which the nodes of the cluster are connected.

In Example 10, Example 10 can further include, wherein the content processing circuitry configured to provide the content indicated by the one or more interest packets includes the content processing circuitry configured to provide attributes with the content in an extended content packet, the attributes comprising at least one of a lineage of the content, a device from which the content originated, and a service level agreement associated with the content.

Example 11 can include a method performed by a node of a cluster of nodes of an information-centric network (ICN), the method comprising issuing a message to other nodes of the cluster indicating that the node is going to be unavailable, receiving, from the other nodes, one or more interest packets for content stored on a content store of the node, and providing the content indicated by the one or more interest packets to the other nodes of the cluster.

In Example 12, Example 11 can further include determining at least one of (1) a signal strength of a signal from the node is less than a signal strength threshold, (2) a battery level of the node is less than a battery threshold, and (3) the node will be put in a sleep mode in a specified amount of time.

In Example 13, Example 12 can further include, wherein issuing the message to the other nodes includes issuing the message in response to the determining at least one of (1) a signal strength of a signal from the node is less than a signal strength threshold, (2) a battery level of the node is less than a battery threshold, and (3) the node will be put in a sleep mode in a specified amount of time.

In Example 14, Example 13 can further include, after providing the content indicated by the one or more interest packets to the other nodes of the cluster, performing a handoff to a network different from the network to which the nodes of the cluster are connected.

In Example 15, Example 14 can further include, wherein providing the content indicated by the one or more interest packets includes providing attributes with the content in an extended content packet, the attributes comprising at least one of a lineage of the content, a device from which the content originated, and a service level agreement associated with the content.

Example 16 can include a non-transitory machine-readable storage device including instructions stored thereon that, when executed by content processing circuitry of a node of a cluster of nodes of an information-centric network (ICN), configure the node to issue a message to other nodes of the cluster indicating that the node is going to be unavailable, receive, from the other nodes, one or more interest packets for content stored on a content store of the node, and provide the content indicated by the one or more interest packets to the other nodes of the cluster.

In Example 17, Example 16 can further include instructions that, when executed by the content processing circuitry, configure the node to determine at least one of (1) a signal strength of a signal from the node is less than a signal strength threshold, (2) a battery level of the node is less than a battery threshold, and (3) the node will be put in a sleep mode in a specified amount of time.

In Example 18, Example 17 can further include, wherein the instructions for issuing the message to the other nodes include instructions for issuing the message in response to the determining at least one of (1) a signal strength of a signal from the node is less than a signal strength threshold, (2) a battery level of the node is less than a battery threshold, and (3) the node will be put in a sleep mode in a specified amount of time.

In Example 18, Example 17 can further include, instructions that, when executed by the content processing circuitry, configure the node to, after providing the content indicated by the one or more interest packets to the other nodes of the cluster, performing a handoff to a network different from the network to which the nodes of the cluster are connected.

In Example 19, Example 18 can further include, wherein the instructions for providing the content indicated by the one or more interest packets include instructions for providing attributes with the content in an extended content packet, the attributes comprising at least one of a lineage of the content, a device from which the content originated, and a service level agreement associated with the content.

Example 20 can include a non-transitory machine-readable storage device including instructions stored thereon that, when executed by processing circuitry of a first node of a cluster of nodes of an information-centric network (ICN), configure the first node to receive a message from a second node of the cluster of nodes indicating that the second node is going to be unavailable, issue, in response to receiving the message, an interest packet for content stored on the second node, and receive, from the second node, a content packet associated with the issued interest packet.

In Example 21, Example 20 can further include, instructions stored thereon that, when executed by the processing circuitry, configure the first node to identify, in an extended content store of the first node, content in a content store of the second node that is used by the first node, and wherein the instructions for issuing the interest packet include instructions for issuing the interest packet for the identified content.

In Example 22, Example 21 can further include, wherein the instructions for identifying the content in the content store of the second node include instructions for at least one of (1) reading a value of a data location attribute associated with the content and (2) reading a value of a lineage attribute associated with the content.

In Example 23, Example 22 can further include instructions stored thereon that, when executed by processing circuitry of a first node of a cluster of nodes of an information-centric network (ICN), configure the first node to determine that the extended content store has insufficient space to store the received content, and perform a context-selective compression of the content in the extended content store.

In Example 24, Example 23 can further include, wherein the instructions for performing the context-selective compression of the content in the extended content store include instructions for removing content, if any, that includes a service level agreement attribute that indicates the service level agreement has expired and then removing content, if any, that includes a time-to-live attribute.

In Example 25, Example 24 can further include instructions stored thereon that, when executed by processing circuitry of a first node of a cluster of nodes of an information-centric network (ICN), configure the first node to determine, after performing the context-selective compression of the content, that there is still insufficient space to store the received content and removing content in violation of the service level agreement attribute, and provide an alert indicating that the service level agreement was violated.

Example 26 can include a device of an information-centric network, the device comprising a content store including published content and attributes of the published content stored thereon, the attributes including at least two of a device from which the content originated attribute, a lineage attribute, and a service level agreement attribute, and content processing circuitry coupled to the content store, the content processing circuitry configured to manage the published content based on the attributes, receive a message from a second node of the cluster of nodes indicating that the second node is going to be unavailable, issue, in response to receiving the message, an interest packet for content stored on the second node, and receive, from the second node, a content packet associated with the issued interest packet.

In Example 27, Example 26 can further include, wherein the content processing circuitry is further configured to identify, in an extended content store of the first node, content in a content store of the second node that is used by the first node, and wherein issuing the interest packet includes issuing the interest packet for the identified content.

In Example 28, Example 27 can further include, wherein the content processing circuitry configured to identify the content in the content store of the second node includes the content processing circuitry configured to at least one of (1) read a value of a data location attribute associated with the content and (2) read a value of a lineage attribute associated with the content.

In Example 29, Example 28 can further include, wherein the content processing circuitry is further configured to determine that the extended content store has insufficient space to store the received content, and perform a context-selective compression of the content in the extended content store.

In Example 30, Example 29 can further include, wherein the content processing circuitry configured to perform the context-selective compression of the content in the extended content store includes the content processing circuitry configured to remove content, if any, that includes a service level agreement attribute that indicates the service level agreement has expired and then removing content, if any, that includes a time-to-live attribute.

In Example 31, Example 30 can further include, wherein the content processing circuitry is further configured to determine, after performing the context-selective compression of the content, that there is still insufficient space to store the received content and removing content in violation of the service level agreement attribute, and provide an alert indicating that the service level agreement was violated.

Example 32 can include a method performed by a first node of a cluster of nodes of an information-centric network (ICN), the method comprising receiving a message from a second node of the cluster of nodes indicating that the second node is going to be unavailable, issuing, in response to receiving the message, an interest packet for content stored on the second node, and receiving, from the second node, a content packet associated with the issued interest packet.

In Example 33, Example 32 can further include, identifying, in an extended content store of the first node, content in a content store of the second node that is used by the first node, and wherein issuing the interest packet includes issuing the interest packet for the identified content.

In Example 34, Example 33 can further include, wherein identifying the content in the content store of the second node includes at least one of (1) reading a value of a data location attribute associated with the content and (2) reading a value of a lineage attribute associated with the content.

In Example 35, Example 34 can further include determining that the extended content store has insufficient space to store the received content, and performing a context-selective compression of the content in the extended content store.

In Example 36, Example 35 can further include, wherein performing the context-selective compression of the content in the extended content store includes removing content, if any, that includes a service level agreement attribute that indicates the service level agreement has expired and then removing content, if any, that includes a time-to-live attribute.

In Example 37, Example 36 can further include determining, after performing the context-selective compression of the content, that there is still insufficient space to store the received content and removing content in violation of the service level agreement attribute, and providing an alert indicating that the service level agreement was violated.

Each of these non-limiting examples can stand on its own, or can be combined in various permutations or combinations with one or more of the other examples. Non-transitory merely means that the medium is a tangible media.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
a first node of a cluster of nodes cooperating to share resources for an information-centric network (ICN), the first node comprising a machine-readable storage device including instructions stored thereon that, when executed by processing circuitry of the first node cause the first node to perform operations comprising:
identifying a condition of the first node indicative of the first node becoming unavailable to the cluster of nodes;
issuing a message to a second node of the cluster of nodes in response to the identifying the condition, wherein the message indicates that the first node is going to become unavailable to the cluster of nodes;
prior to the first node becoming unavailable, receiving, from the second node of the cluster of nodes, an interest packet for content stored in a content store of the first node, the interest packet generated based on the message indicating that the first node is going to become unavailable; and transmitting the content indicated by the interest packet to the second node of the cluster of nodes prior to the first node becoming unavailable to prepopulate a cache of the second node so that it can satisfy a second interest packet for the content.

2. The system of claim 1, wherein the operation of identifying the condition comprises determining at least one of a signal strength of a signal from the first node is less than a signal strength threshold, a battery level of the node is less than a battery threshold, or the first node will be put in a sleep mode in a specified amount of time.

3. The system of claim 2, wherein the operations further comprise: after transmitting the content indicated by the interest packet to the second node of the cluster of nodes, performing a handoff to a network different from the network to which the nodes of the cluster are connected.

4. The system of claim 3, wherein the operation of transmitting the content indicated by the interest packet includes providing attributes with the content in an extended content packet, the attributes comprising at least one of a lineage of the content, a device from which the content originated, or a service level agreement associated with the content.

5. The system of claim 3 wherein the second node is configured to:
identify, in an extended content store of the second node, content in a content store of the first node of the cluster of nodes that is used by the node; and
transmit the interest packet for the identified content to the first node.

6. A non-transitory machine-readable medium including instructions that, when executed by a node of a cluster of nodes cooperating to share resources for an information-centric network (ICN), cause the node to perform operations comprising:
detecting a condition of the node indicative of the node becoming unavailable to the cluster of nodes;
issuing a message to other nodes of the cluster in response to identifying the condition, wherein the message indicates that the node is going to become unavailable to the cluster of nodes;
prior to the node becoming unavailable, receiving, from another node of the cluster of nodes, an interest packet for content stored in a content store of the node, the interest packet generated based on the message indicating that the node is going to become unavailable; and
transmitting the content indicated by the interest packet to the another node of the cluster of nodes prior to the node becoming unavailable to prepopulate a cache of the another node so that it can satisfy a second interest packet for the content.

7. The non-transitory machine-readable medium of claim 6, wherein determining the condition comprises determining at least one of a signal strength of a signal from the node is less than a signal strength threshold, a battery level of the node is less than a battery threshold, or the node will be put in a sleep mode in a specified amount of time.

8. The non-transitory machine-readable medium of claim 7, the operations further comprising, after transmitting the content indicated by the interest packet to the other nodes of the cluster, performing a handoff to a network different from the network to which the nodes of the cluster are connected.

9. The non-transitory machine-readable medium of claim 8, wherein transmitting the content indicated by the interest packet includes providing attributes with the content in an extended content packet, the attributes comprising at least one of a lineage of the content, a device from which the content originated, and a service level agreement associated with the content.

10. The non-transitory machine-readable medium of claim 7, wherein determining the condition comprises determining the signal strength of the signal from the node is less than the signal strength threshold.

11. The non-transitory machine-readable medium of claim 7, wherein determining the condition comprises determining the battery level of the node is less than the battery threshold.

12. The non-transitory machine-readable medium of claim 7, wherein determining the condition comprises determining the node will be put in the sleep mode in the specified amount of time.

13. A non-transitory machine-readable medium including instructions that, when executed by a node of a cluster of nodes cooperating to share resources for an information-centric network (ICN), cause the node to perform operations comprising:
receiving a message from another node of the cluster of nodes indicating that the another node is going to become unavailable to the cluster of nodes in response to a condition of the another node;
prior to the another node of the cluster of nodes becoming unavailable, and in response to the message indicating that the another node is going to become unavailable, transmitting, by the node, an interest packet to the another node of the cluster of nodes for content stored in a content store of the another node of the cluster of nodes; and
receiving the content indicated by the interest packet from the another node of the cluster of nodes prior to the another node of the cluster of nodes becoming unavailable to prepopulate a cache of the node so that it can satisfy a second interest packet for the content.

14. The non-transitory machine-readable medium of claim 13, the operations further comprising:
identifying, in an extended content store of the node, content in a content store of the another node of the cluster of nodes that is used by the node;
wherein transmitting the interest packet includes issuing the interest packet for the identified content.

15. The non-transitory machine-readable medium of claim 14, wherein identifying the content in the content store of the another node of the cluster of nodes comprises reading a value of a data location attribute associated with the content or reading a value of a lineage attribute associated with the content.

16. The non-transitory machine-readable medium of claim 15, the operations further comprising:
determining that the extended content store has insufficient space to store the received content; and
performing a context-selective compression of the content in the extended content store.

17. The non-transitory machine-readable medium of claim 16, wherein performing the context-selective compression of the content in the extended content store comprises removing content, if any, that includes a service level agreement attribute that indicates the service level agreement has expired and then removing content, if any, that includes a time-to-live attribute.

18. The non-transitory machine-readable medium of claim 17, the operations further comprising:
  determining, after performing the context-selective compression of the content, that there is still insufficient space to store the received content and removing content in violation of the service level agreement attribute; and
  providing an alert indicating that the service level agreement was violated.

19. The non-transitory machine-readable medium of claim 15, wherein identifying the content in the content store of the another node of the cluster of nodes comprises reading the value of the data location attribute associated with the content.

20. The non-transitory machine-readable medium of claim 15, wherein identifying the content in the content store of the another node of the cluster of nodes comprises reading the value of the lineage attribute associated with the content.

\* \* \* \* \*